(12) United States Patent
Deo et al.

(10) Patent No.: US 12,158,687 B2
(45) Date of Patent: Dec. 3, 2024

(54) SYSTEM AND METHOD FOR PROVIDING INCREASED NUMBER OF TIME SYNCHRONIZED OUTPUTS BY USING COMMUNICATING PRIMARY AND SECONDARY DEVICES

(71) Applicant: Cirrus Logic International Semiconductor Ltd., Edinburgh (GB)

(72) Inventors: Sachin Deo, Austin, TX (US); Nariankadu D. Hemkumar, Austin, TX (US); Akhilesh Persha, Austin, TX (US); Younes Djadi, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 874 days.

(21) Appl. No.: 17/320,528

(22) Filed: May 14, 2021

(65) Prior Publication Data

US 2021/0356843 A1 Nov. 18, 2021

Related U.S. Application Data

(60) Provisional application No. 63/186,022, filed on May 7, 2021, provisional application No. 63/024,735, filed on May 14, 2020.

(51) Int. Cl.
*G06F 1/10* (2006.01)
*G03B 5/04* (2021.01)
(Continued)

(52) U.S. Cl.
CPC .............. *G03B 13/36* (2013.01); *G03B 5/04* (2013.01); *G03B 2205/0015* (2013.01); *G03B 2205/0069* (2013.01)

(58) Field of Classification Search
CPC .................................... G06F 1/12; G06F 1/10
See application file for complete search history.

(56) References Cited

U.S. PATENT DOCUMENTS

| 4,599,719 A | 7/1986 | Breen et al. |
| 7,358,809 B2 | 4/2008 | Elder |

(Continued)

OTHER PUBLICATIONS

Ray, Sourja et al. "A 13-b Linear, 40-MS/s Pipelined ADS with Self-Configured Capacitor Matching." IEEE Journal of Solid-State Circuits, vol. 42, No. 3, Mar. 2007. pp. 463-474.

*Primary Examiner* — Phil K Nguyen
(74) *Attorney, Agent, or Firm* — E. Alan Davis; Huffman Law Group, PC (57) ABSTRACT

A system includes primary and secondary devices (e.g., camera controllers that drive voice coil motors) each having respective outputs and a communication link. The primary device includes first and second hardware timers, each of which expires at a time derived from a periodic control loop trigger. At first timer expiration, the primary transmits first updated values to the secondary. At second timer expiration, primary device hardware picks up and applies second updated values to the primary device outputs. In response to receiving the first updated values from the primary device, the secondary device applies the received first updated values to its outputs. The primary/secondary device combination provide a sufficient number of total outputs that they could not individually provide and further synchronize the outputs with small skew through the timers, which are programmable to also accommodate processing of inputs (e.g., from voice coil motor sensors) to compute the outputs.

24 Claims, 10 Drawing Sheets

(51) Int. Cl.
*G03B 13/36* (2021.01)
*G06F 1/12* (2006.01)

(56) References Cited

U.S. PATENT DOCUMENTS

| | | |
|---|---|---|
| 9,735,736 B2 | 8/2017 | Kusuda |
| 9,859,907 B1 | 1/2018 | Li |
| 9,876,518 B2 | 1/2018 | Kim et al. |
| 10,158,444 B1* | 12/2018 | Darras .................... H03K 3/01 |
| 10,382,687 B1 | 8/2019 | Patel et al. |
| 10,396,724 B1 | 8/2019 | Daigle et al. |
| 11,228,291 B2 | 1/2022 | Kusuda |
| 11,621,683 B2 | 4/2023 | Xu et al. |
| 2006/0016966 A1 | 1/2006 | Hughes et al. |
| 2007/0050582 A1 | 3/2007 | Mangione-Smith |
| 2008/0240301 A1 | 10/2008 | Mandal et al. |
| 2010/0019842 A1 | 1/2010 | Larson et al. |
| 2010/0290769 A1 | 11/2010 | Nasiri et al. |
| 2011/0063146 A1 | 3/2011 | Matthews et al. |
| 2011/0228667 A1* | 9/2011 | Wang ................. H04L 41/0659 370/216 |
| 2012/0063756 A1 | 3/2012 | Kang et al. |
| 2012/0096290 A1 | 4/2012 | Shkolnikov et al. |
| 2013/0124763 A1* | 5/2013 | Kessler ............... G06F 11/0754 710/110 |
| 2014/0077873 A1 | 3/2014 | Motz et al. |
| 2014/0079098 A1 | 3/2014 | Harjani et al. |
| 2014/0225591 A1 | 8/2014 | Knierim et al. |
| 2014/0229754 A1* | 8/2014 | Overby ............... G06F 11/3013 713/340 |
| 2015/0134862 A1 | 5/2015 | Sthoeger et al. |
| 2015/0319365 A1 | 11/2015 | Lloyd et al. |
| 2016/0269828 A1* | 9/2016 | Smith .................... H04R 3/14 |
| 2018/0076780 A1 | 3/2018 | Wang et al. |
| 2018/0270424 A1 | 9/2018 | Li et al. |
| 2019/0320377 A1* | 10/2019 | Maruta ................. H04W 84/10 |
| 2020/0019378 A1* | 1/2020 | Watanabe ............... G06F 7/584 |
| 2020/0065212 A1* | 2/2020 | Chanda ................ H04L 41/142 |
| 2020/0120283 A1 | 4/2020 | Min |
| 2020/0307832 A1 | 10/2020 | Wichowski et al. |
| 2020/0393529 A1 | 12/2020 | Larson et al. |
| 2021/0029319 A1 | 1/2021 | McFarland et al. |
| 2021/0096389 A1 | 4/2021 | Kim |
| 2021/0143835 A1 | 5/2021 | Gonzalez et al. |
| 2021/0258136 A1* | 8/2021 | Hoffleit ..................... G06F 1/14 |
| 2021/0305955 A1 | 9/2021 | Ozalevli |
| 2021/0321039 A1 | 10/2021 | Kim et al. |
| 2022/0124568 A1* | 4/2022 | Wu ....................... H04W 88/02 |
| 2022/0190789 A1 | 6/2022 | Zanbaghi et al. |
| 2022/0190794 A1 | 6/2022 | Schneider et al. |
| 2022/0321765 A1 | 10/2022 | Djadi et al. |
| 2022/0329725 A1 | 10/2022 | Djadi et al. |
| 2022/0413474 A1* | 12/2022 | Nishiyama ........... G05B 19/052 |
| 2023/0117027 A1 | 4/2023 | Fang et al. |
| 2023/0209189 A1 | 6/2023 | Feng |
| 2024/0179655 A1* | 5/2024 | Harada ................. H04W 56/00 |

* cited by examiner

SYSTEM AND METHOD FOR PROVIDING INCREASED NUMBER OF TIME SYNCHRONIZED OUTPUTS BY USING COMMUNICATING PRIMARY AND SECONDARY DEVICES

CROSS REFERENCE TO RELATED APPLICATION(S)

This application claims priority based on U.S. Provisional Application, Ser. No. 63/024,735, filed May 14, 2020 and claims priority based on U.S. Provisional Application Ser. No. 63/186,022, filed May 7, 2021, each of which is hereby incorporated by reference in its entirety.

BACKGROUND

Camera controllers are used to control and drive a camera (e.g., camera lenses and parts), and such controllers and cameras are used in applications such as smart phones, tablets, and computers. Such a controller or device needs to obtain and process data from the camera lenses and parts. The accurate and efficient delivery and management of data (e.g., datastreams and sub-streams) between the camera controllers and the camera are very important. An example of the delivery and management of such data is provided by U.S. patent application Ser. No. 16/522,580 entitled "FLEXIBLE LATENCY-MINIMIZED DELIVERY AND MANAGEMENT OF DISPARATE-RATE DATA STREAMS AND SUB-STREAMS FOR PROCESSING" filed on 25 Jul. 2018 to inventors James McFarland, Nariankadu Hemkumar, Sachin Deo, and Younes Djadi (hereafter referred to as the "580 Patent Application"), published as U.S. Patent Application Publication 2021/0029319 on Jan. 28, 2021. The 580 Patent Application is hereby incorporated by reference in its entirety.

SUMMARY

In one embodiment, the present disclosure provides a system that includes primary and secondary devices each having one or more respective outputs and a communication link between the primary and secondary devices. The primary device includes first and second hardware timers each of which expires at a time derived from a periodic control loop trigger. At expiration of the first timer, the primary device transmits one or more first updated values to the secondary device over the communication link. At expiration of the second timer, hardware of the primary device picks up and applies one or more second updated values to the one or more outputs of the primary device. In response to receiving the one or more first updated values from the primary device, the secondary device applies the received one or more first updated values to the one or more outputs of the secondary device.

In another embodiment, the present disclosure provides a method for synchronizing outputs of primary and secondary devices each having one or more respective outputs and a communication link between them. The method includes running first and second hardware timers of the primary device each of which expires at a time derived from a periodic control loop trigger. The method also includes transmitting, by the primary device at expiration of the first timer, one or more first updated values to the secondary device over the communication link. The method also includes picking up and applying, by hardware of the primary device at expiration of the second timer, one or more second updated values to the one or more outputs of the primary device. The method also includes applying, by the secondary device in response to receiving the one or more first updated values from the primary device, the received one or more first updated values to the one or more outputs of the secondary device.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
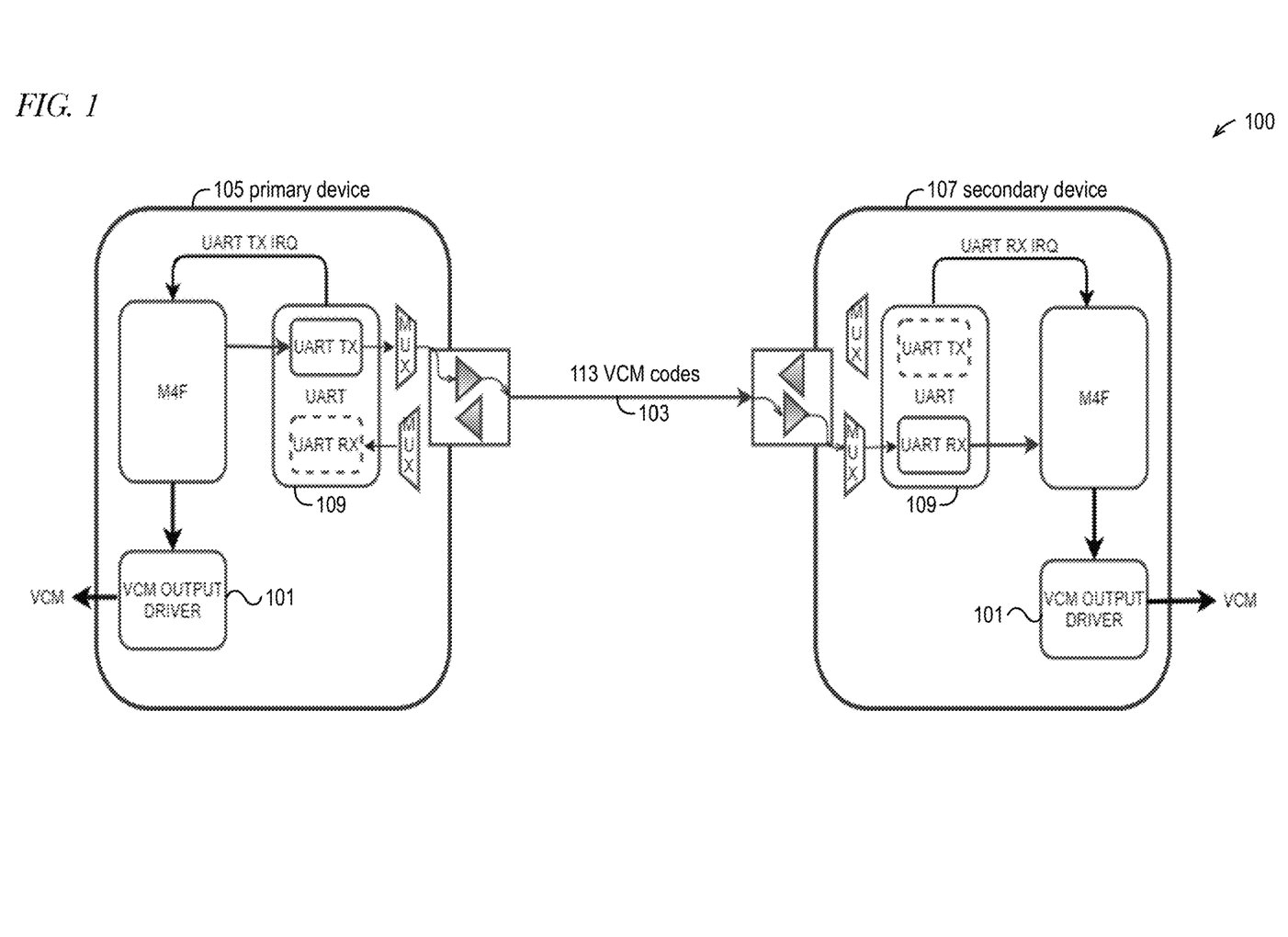
FIG. 1 is an example system of primary and secondary devices in communication with one another to provide an increased number of synchronized outputs in accordance with embodiments of the present disclosure.

In certain camera control systems, there is a need to extend one or more voice coil motor (VCM) driver outputs using a secondary device 107 of FIG. 1 that operates in tandem and in tight synchronization with a primary device 105 of FIG. 1. A Universal Asynchronous Receiver/Transmitter (UART) and Event Timer based method and system are disclosed to achieve such synchronization. This method and system accommodate both major states of operation-open-loop mode and closed-loop mode.

A viable option for extending the VCM output driver channels beyond the number of supported channels on a single device, including but not limited to a camera controller, is to connect two devices (e.g., two camera controllers)

in primary/secondary configuration communicating VCM codes 113 of FIG. 1 over UART 109 of FIG. 1. In general, the primary and secondary devices operate asynchronously with respect to each other. Therefore, it is not practical to have two devices configured and controlled for identical processing to achieve duplication of one or more VCM Driver outputs 101 of FIG. 1, while also ensuring tight synchronization of the same. In order to achieve tight synchronization and duplication, a method and system must be developed, whereby only the primary device does the processing (e.g., by processor M4F of FIG. 1), and the secondary device mirrors the desired output(s).

The primary/secondary output skew is defined to be the time duration between VCM code(s) application on the primary and secondary devices. The desire is to minimize the output skew between the primary device and the secondary device, as well as to minimize the VCM code application latency post processing on both the primary and secondary devices. In addition, it is highly desirable to have VCM code transmission (from the primary device) and reception (on the secondary device) to be non-blocking (neither entity is required to wait on the other for transmission and/or reception). Finally, the method and system should be efficient to minimally impact processing capabilities on the primary device and/or the secondary device.

The system 100 and method shown in FIG. 1 and in accordance with the present disclosure duplicates one VCM driver output 101 from the primary device 105 onto the secondary device 107. However, the system and method may also be used to duplicate all of the primary device's VCM driver outputs 101, constrained only by the speed of the UART communication link 103, excess processing capability, and time duration between computation of VCM codes 103 and the desired application latency on the VCM drivers 101.

The system and method below provide four (4) VCM outputs: two (2) OIS (Optical Image Stabilization)+one (1) AF (Auto-Focus) on the primary device, and one (1) AF on the secondary device. The AF VCM output driver on the secondary device duplicates AF VCM output driver on the primary device. The specific realization of the method described below allows for synchronized update of both the primary and secondary AF VCM driver outputs in both open-loop and closed-loop modes of operation with an output skew of less than 20 µs. The same system may also be devised to provide two (2) OIS VCM outputs on the primary device and two (2) AF VCM outputs on the secondary device. In general, many configurations are possible including swapping of OIS and AF VCM outputs on the primary and secondary devices as described above.

An example embodiment of the present disclosure is provided and organized in detail as follows: software framework, VCM Code packet structure to ensure basic minimum integrity, UART Transmit driver on the primary device, UART Receive driver on the secondary device and run-time execution context of UART communication in open-loop and closed-loop modes of operation and mode switching thereof.

Software Framework

Figure 2:
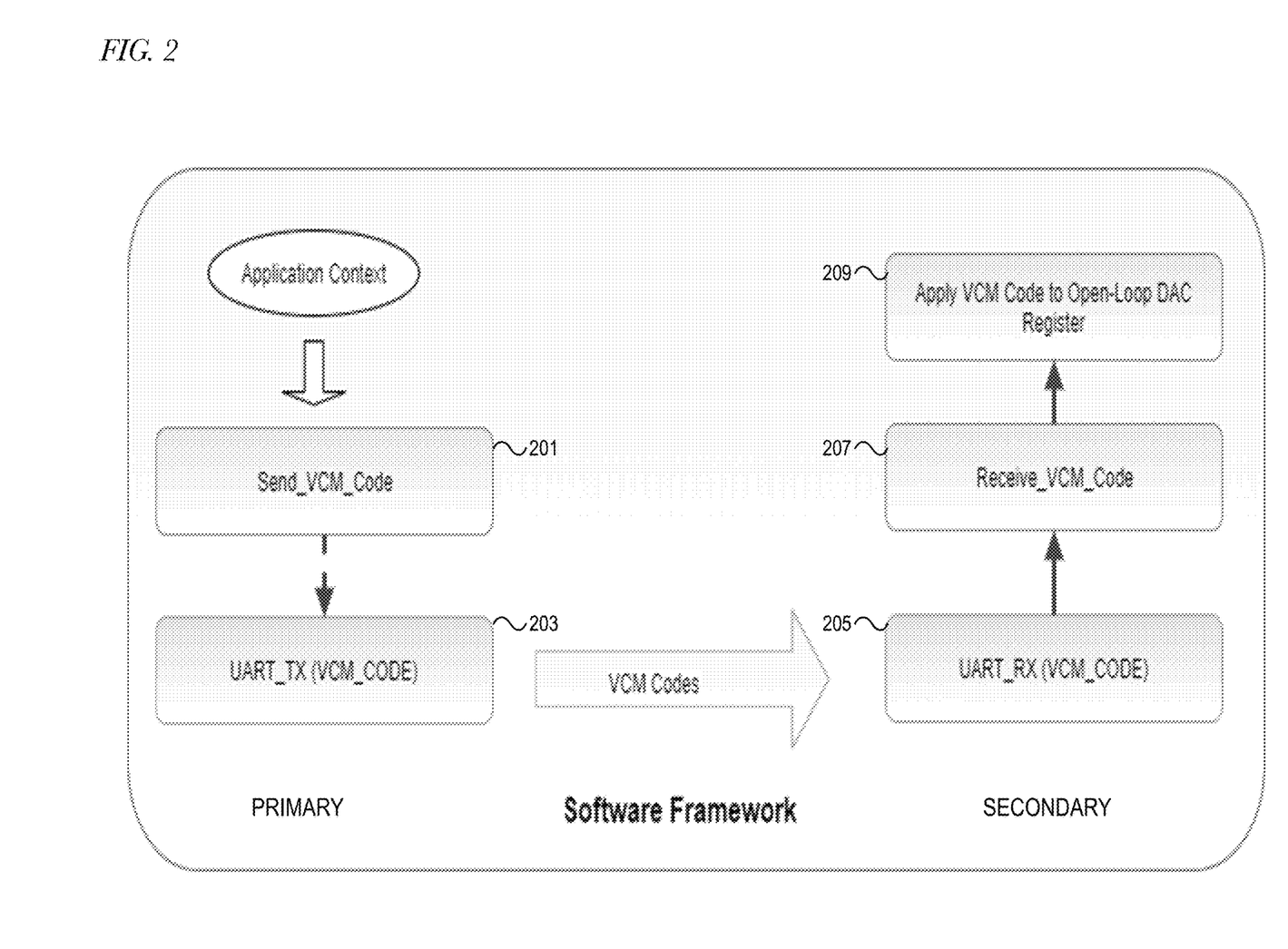
FIG. 2 is an example firmware driver framework on the primary device and the secondary devices of FIG. 1 in accordance with embodiments of the present disclosure.

Firmware driver framework on the primary device and the secondary device is outlined in the diagram shown as FIG. 2. The primary device transmits VCM codes (blocks 201 and 203) in one of the two system states-closed-loop mode or open-loop mode over UART. The secondary device receives VCM codes (blocks 205 and 207) and applies them to the open-loop digital-to-analog converter (DAC) register (block 209). While the primary device may be in the open-loop mode or closed-loop mode of operation, the secondary device always operates in the open-loop mode.

VCM Packet Structure

Figure 3:
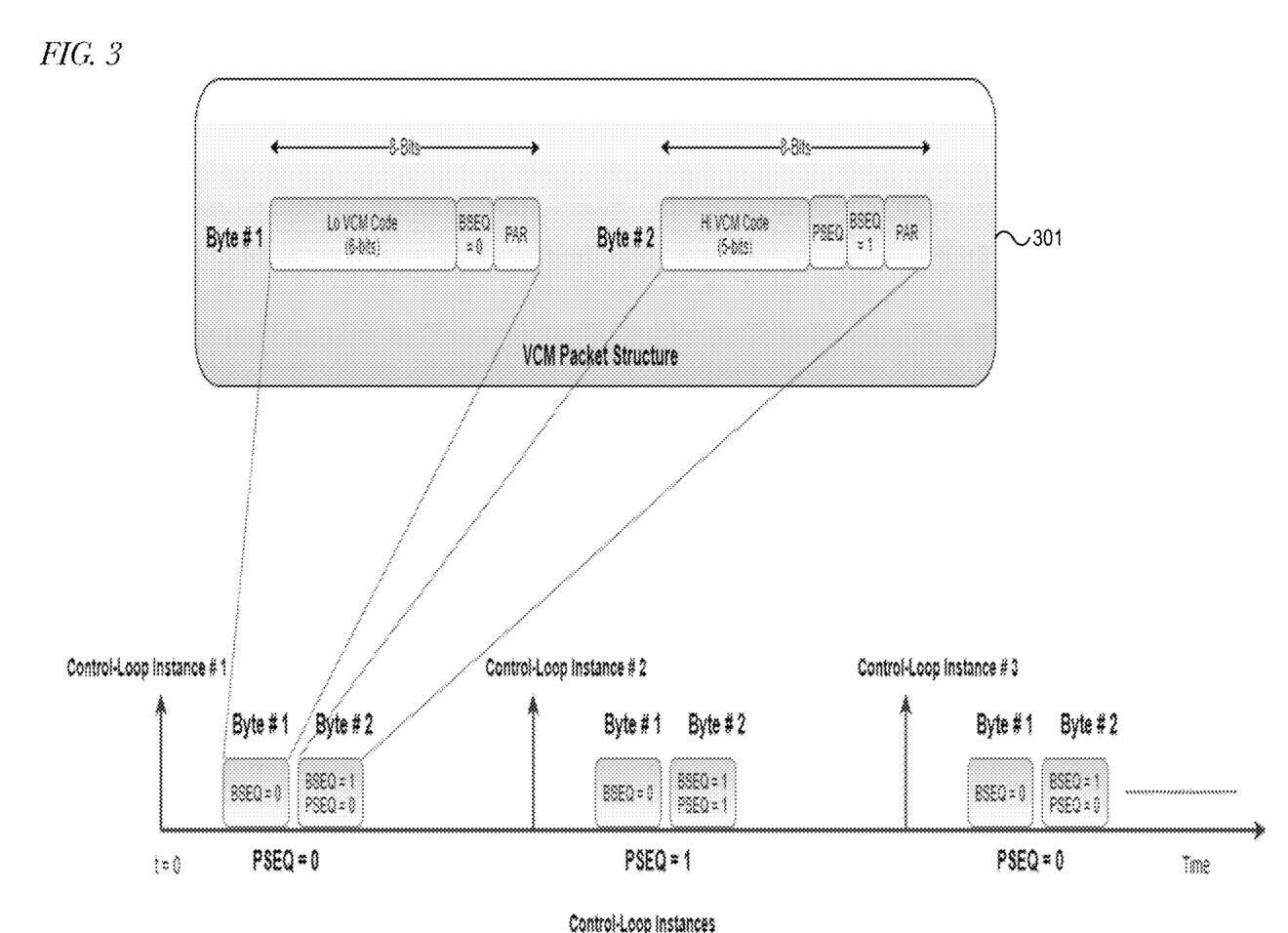
FIG. 3 is an example Universal Asynchronous Receiver Transmitter (UART) packet structure for transmission between the primary and secondary devices of FIG. 1 in accordance with embodiments of the present disclosure.

Each eleven (11)-bit AF VCM current DAC (IDAC) code is sent over a UART packet. A two (2)-byte packet structure 301 to ensure basic integrity of sequence, data, and packet is shown in FIG. 3. Parity bit (P) checks data integrity by indicating odd parity of bits, Byte sequence bit (BSEQ) identifies correct byte order within a packet, and the Packet sequence bit (PSEQ) identifies alternate (odd/even) packets as a check on the expected packet sequence versus received packet sequence.

UART Receive Driver

Figure 4:
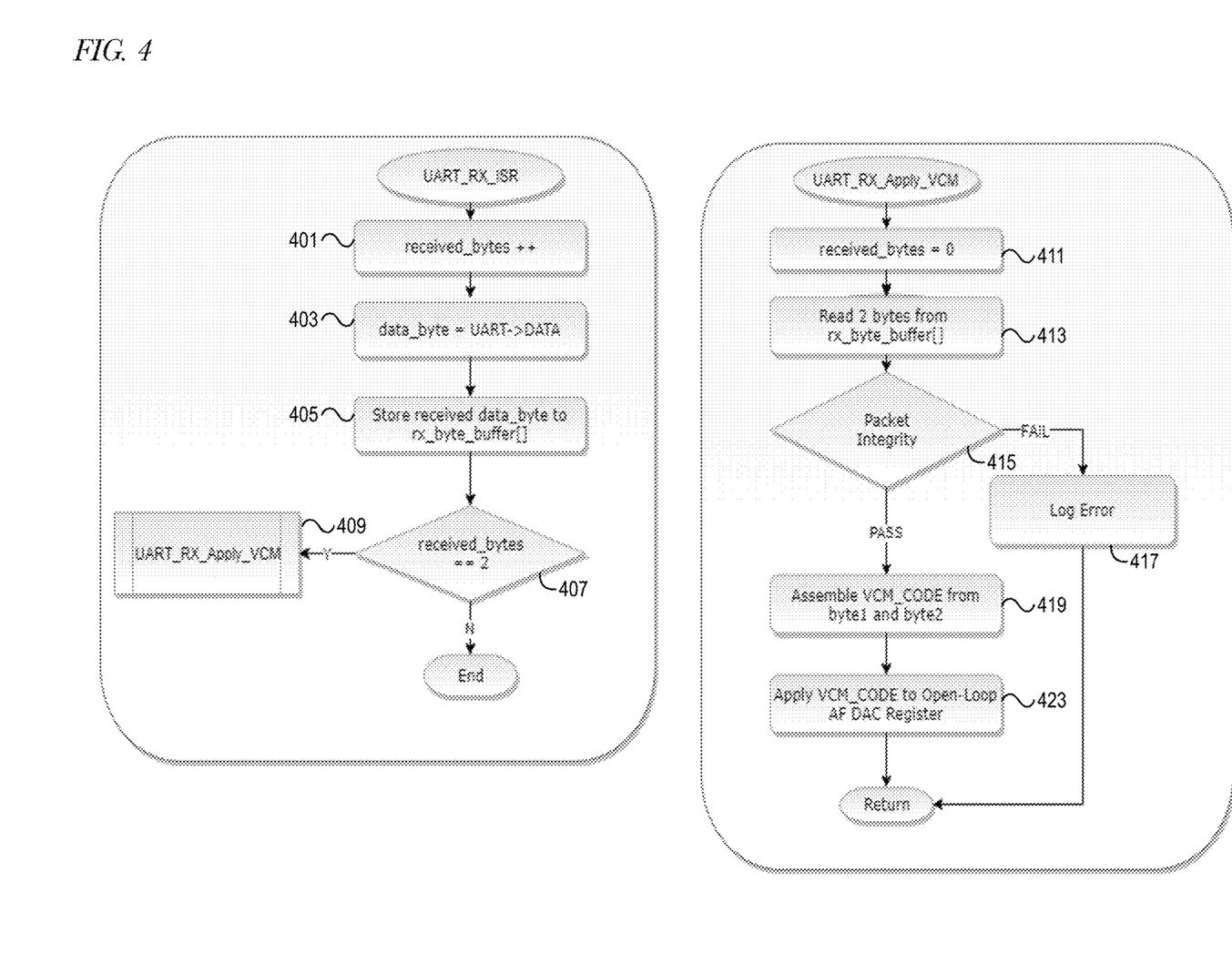
FIG. 4 is an example flowchart illustrating an UART Receive Interrupt Service Routine (ISR) process of the secondary device of FIG. 1 in accordance with embodiments of the present disclosure.

The application of VCM code on the secondary device is done entirely in UART Receive ISR (Interrupt Service Routine)—UART_RX_ISR-context. As soon as a complete VCM packet is received on the secondary device (blocks 401 through 407), VCM code is extracted from the packet after it passes a basic integrity check (blocks 411 through 417). The extracted VCM code is applied to the open-loop DAC register on the secondary device for immediate effect (block 409 and blocks 419 and 423). This process on the secondary device is shown in the flow-chart of FIG. 4.

UART Transmit Driver

Unlike the secondary device, which applies the VCM code immediately upon receipt, the primary device precisely times the application of the VCM code to coordinate the timing of the application and keeps the primary/secondary skew to a minimum. The handling of the VCM code on the primary device depends on the system state-(a) open-loop mode and (b) closed-loop mode.

Open-Loop

In the open-loop mode, the primary device receives the open-loop DAC code from the host processor over an I2C interface. In the absence of full duplex UART communication, the primary/secondary synchronization is achieved by the primary device deferring and precisely delaying the application of received open-loop code until after initiating the transmission of open-loop code to the secondary device over UART. On the primary device, indication of the secondary device receiving the VCM Code packet is acknowledged via UART_TX_ISR which triggers upon completion of the UART transmission. The flow-chart shown in FIG. 5 outlines the handling of open-loop code on the primary device in an I2C ISR that services host processor command for open-loop DAC codes.

Figure 5:
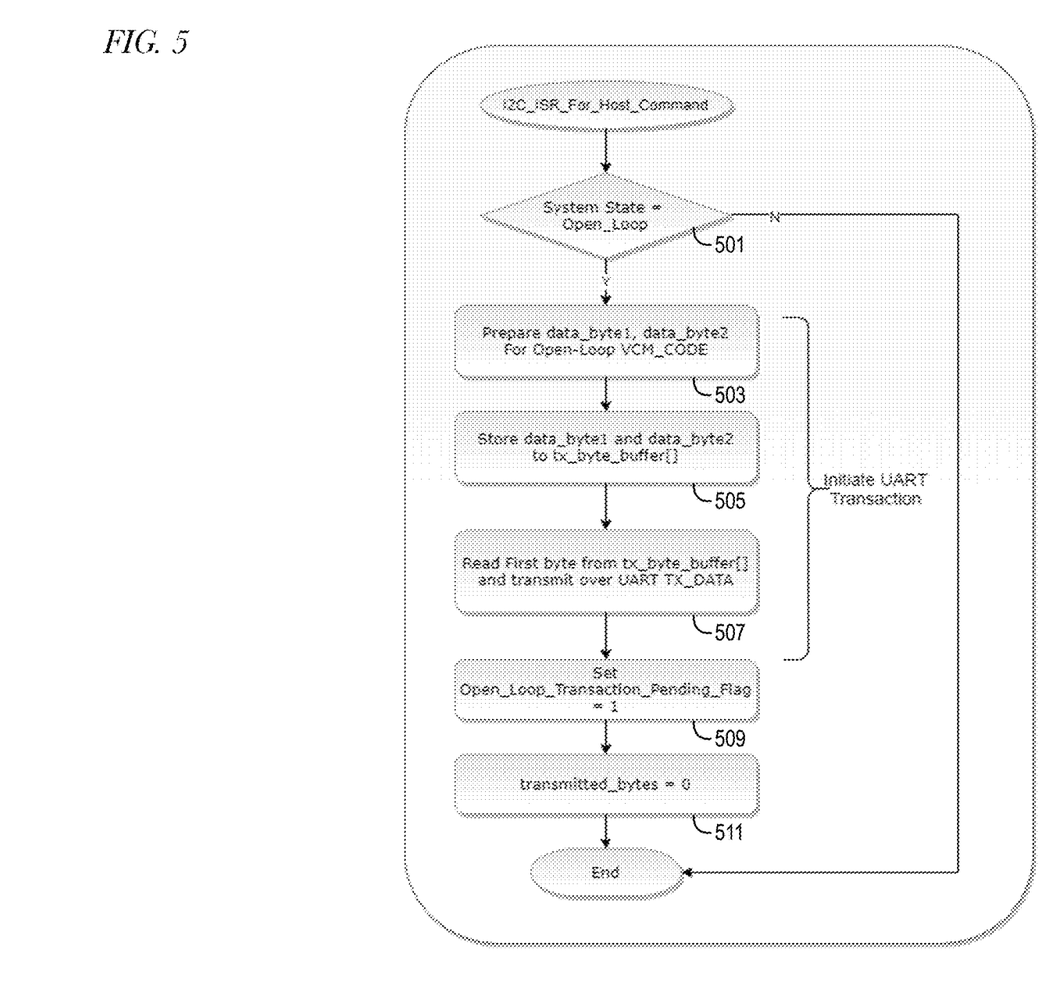
FIG. 5 is an example flowchart illustrating the handling of open-loop code on the primary device of FIG. 1 in an I2C ISR that services host processor commands for open-loop digital-to-analog converter (DAC) codes in accordance with embodiments of the present disclosure.
Figure 6:
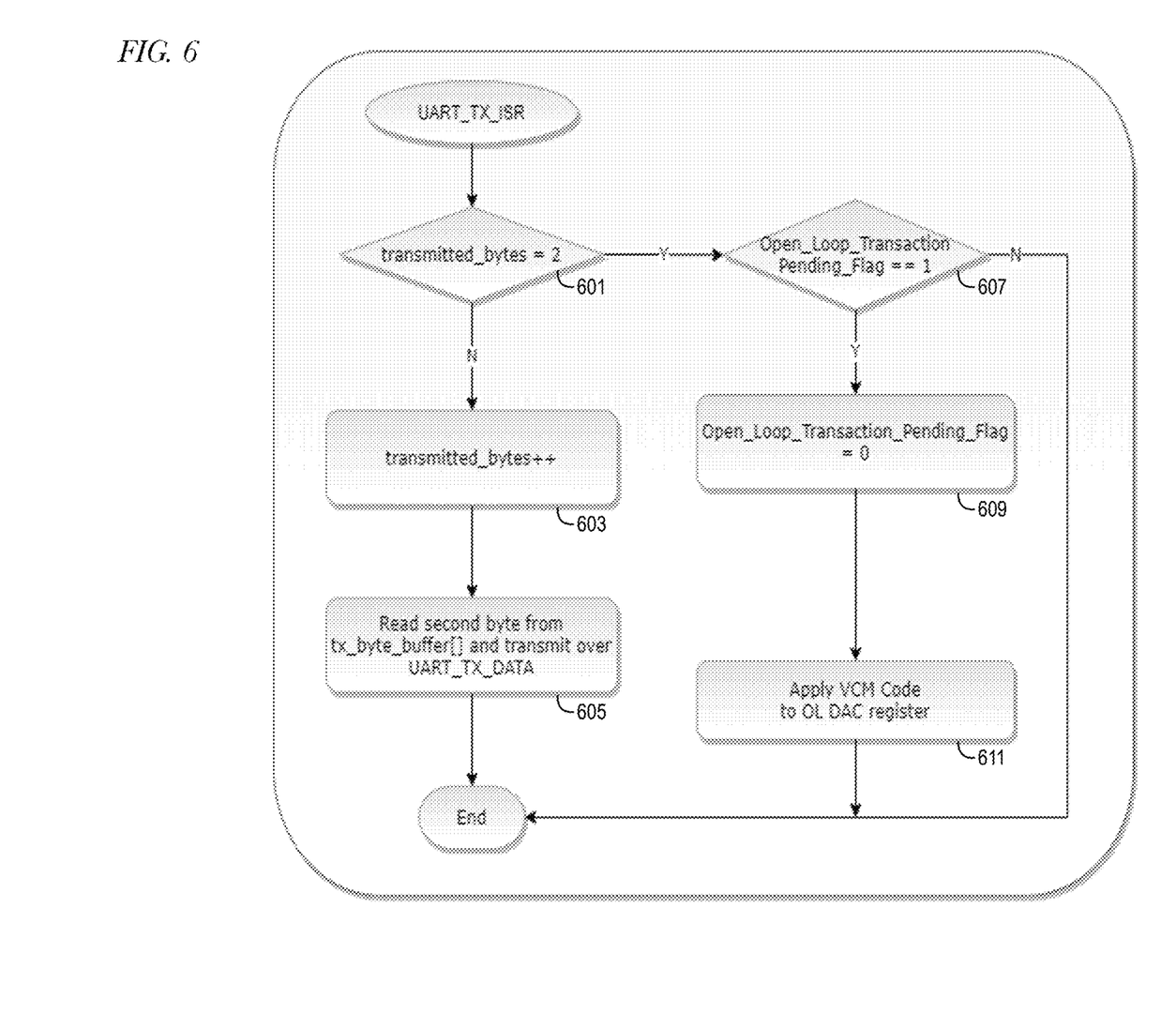
FIG. 6 is an example flowchart illustrating an UART Transit ISR process of the primary device of FIG. 1 in accordance with embodiments of the present disclosure.

As shown in the above flow-chart of FIG. 5, in the open-loop mode (block 501), the primary device forms VCM packet and initiates transfer over UART (blocks 503 through 507). The primary device also sets the Open_Loop_Transaction pending flag (blocks 509 and 511) indicating that upon completion of transmission of the UART packet (blocks 601 through 609), open-loop VCM code needs to be applied to the output driver (block 611) on the primary device in the UART Transmit ISR-UART_TX_ISR. The flow-chart of FIG. 6 outlines UART_TX_ISR.

Closed-Loop

In the closed-loop mode of operation (block 701), there is a fixed but programmable cadence of application of closed-loop DAC codes to the output driver with respect to each instance of the control-loop. Each instance of the control loop computes the closed-loop VCM codes (blocks 703 and 705) based on the sensor inputs and host position command. However, the application of the closed-loop VCM codes to the output driver is hardware assisted and takes place after a programmable delay from the start of each control loop instance. In order to synchronize the application of VCM codes between the primary device and the secondary device, the primary device uses the Event Timer capability of the hardware. Event Timer produces an event/interrupt at a programmable delay with respect to an external trigger. In this case, the commencement of each instance of the control loop starts the count-down of the Event Timer. The programmable delay between the commencement of each instance of control-loop and the event on the primary device is programmed such that the event is triggered just enough before the hardware pick-up of closed-loop DAC code to both facilitate the transmission (blocks 707 and 709) and to account for the time to transmit the VCM code packet and its application on the secondary device to approximately coincide with the hardware pickup on the primary device. Handling of transmission of VCM code in Event_Timer_ISR is depicted in the flow-chart of FIG. 7.

Run-Time Execution Context

Figure 8A:
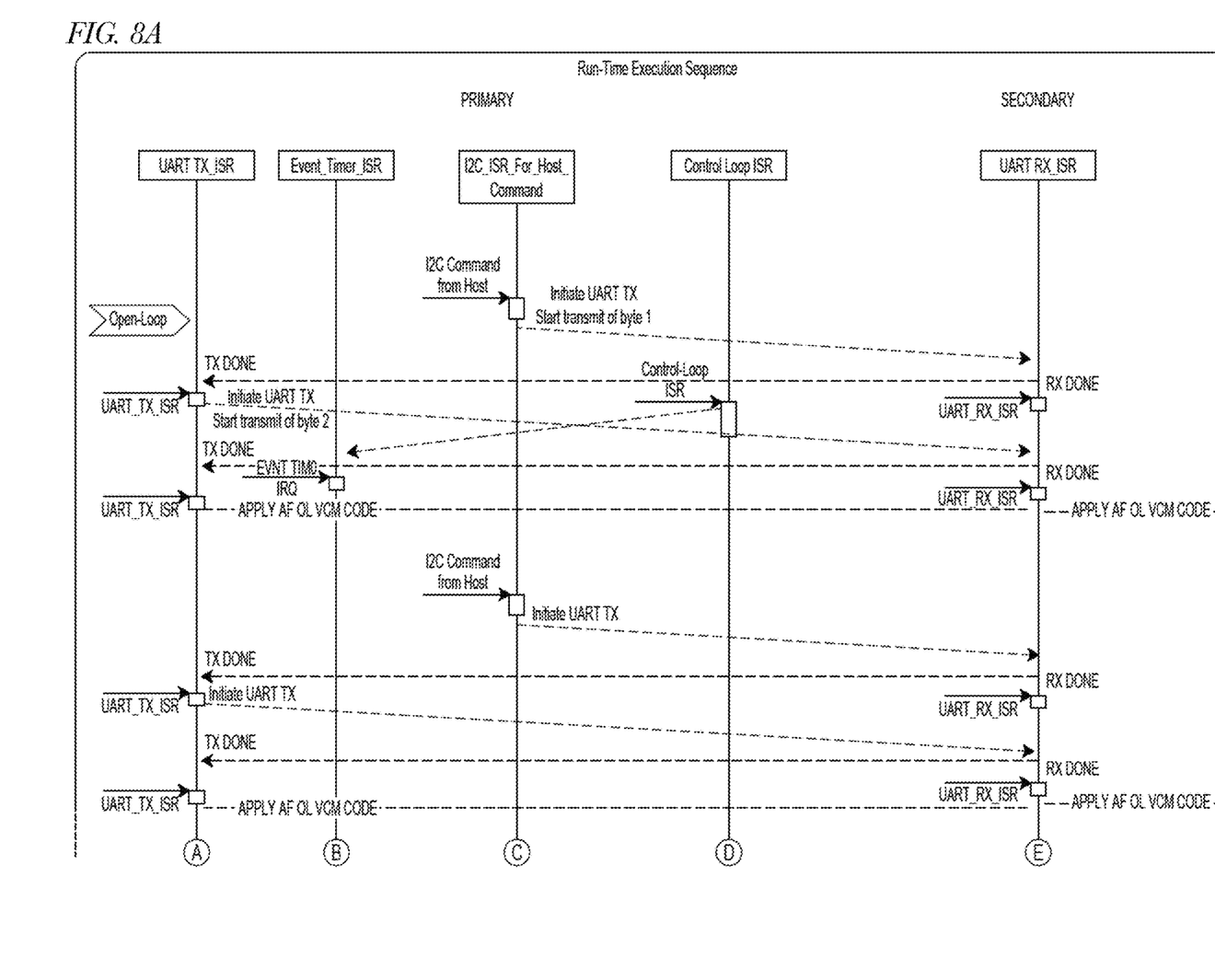
FIGS. 8A and 8B are an example timing diagram illustrating run-time execution flow for open-loop and closed-loop states of the system of FIG. 1 in accordance with embodiments of the present disclosure.
Figure 8B:
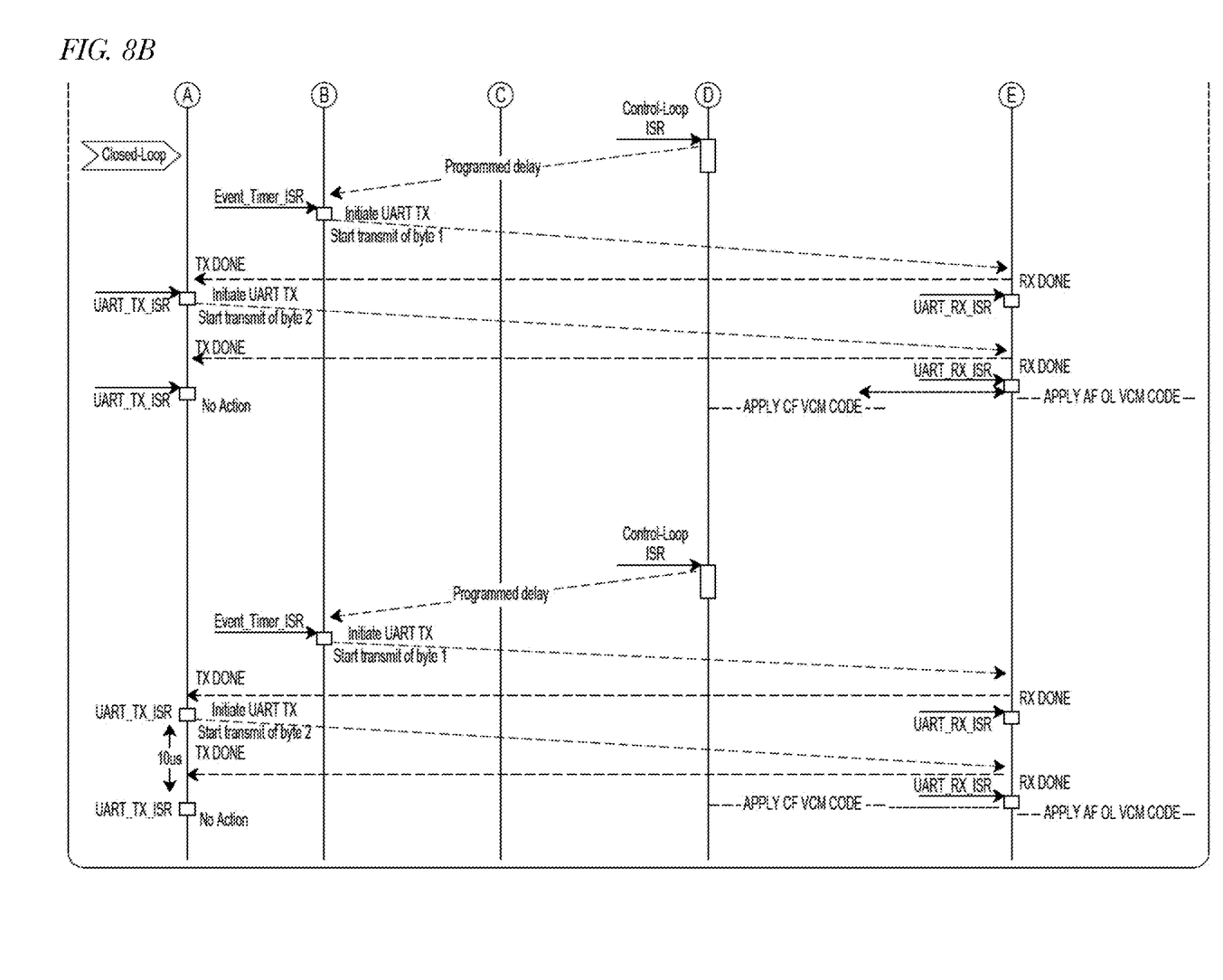

The run-time execution flow for the open-loop and closed-loop system states is depicted in FIGS. 8A and 8B, referred to collectively as FIG. 8. As shown in FIG. 8, the primary/secondary synchronization is achieved in both the system states. The use of Event Timer has been demonstrated to precisely control the timing of transmission of closed-loop codes so that hardware DAC pick-up on the primary device happens at the same time when these codes are received and applied on the secondary device.

Figure 9:
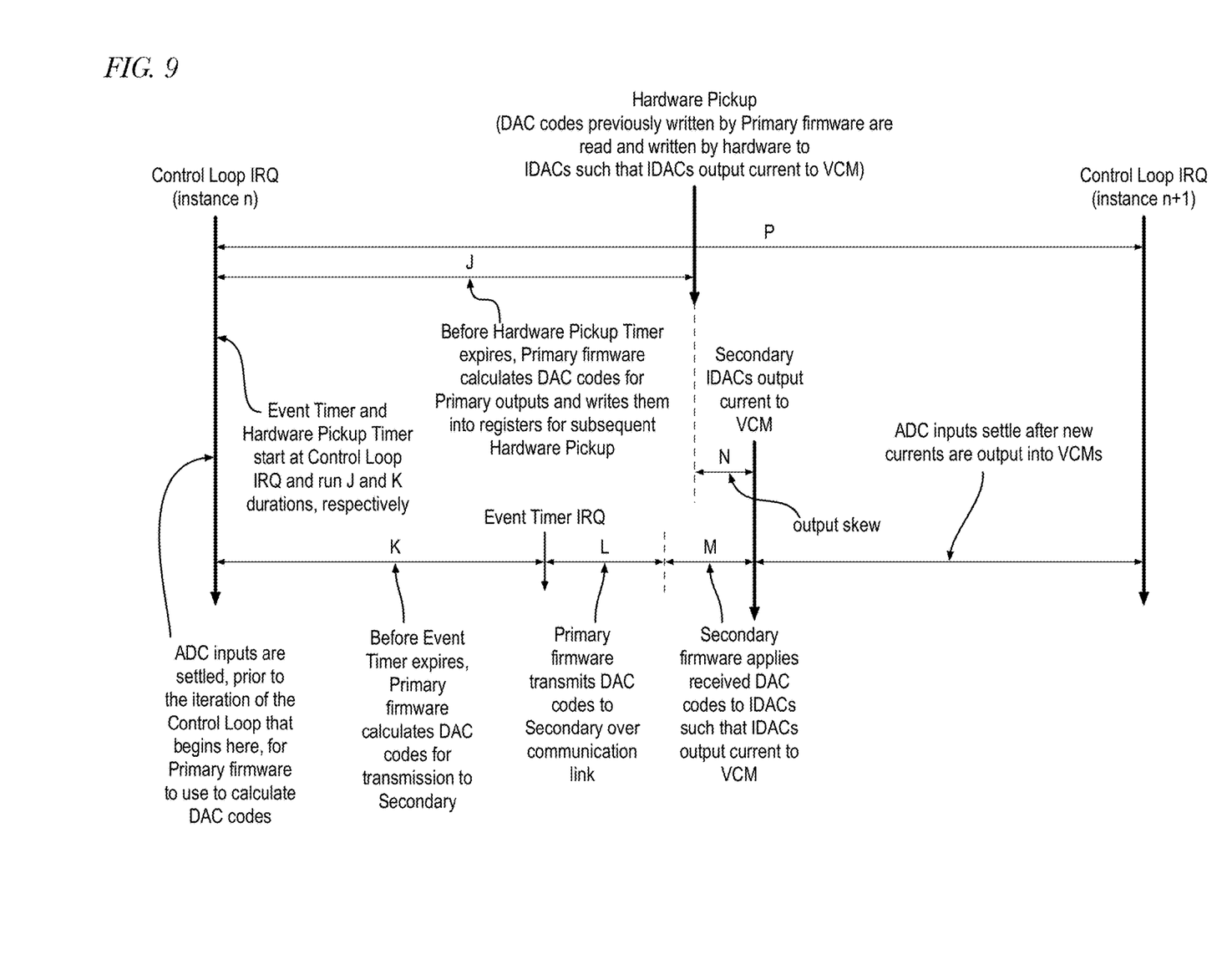
FIG. 9 is an example timing diagram illustrating operation of the system of FIG. 1 in accordance with embodiments of the present disclosure.

FIG. 9 is an example timing diagram illustrating operation of the system 100 of FIG. 1 according to embodiments of the present disclosure. FIG. 9 depicts in horizontally increasing time operation of the system 100 in closed-loop mode similarly depicted in vertically increasing time in FIG. 8. It is noted that although the system 100 is operating as a whole in closed-loop mode, the secondary device continues to operate in open-loop mode. That is, although the primary device periodically updates its outputs and transmits DAC codes to the secondary device in a closed-loop fashion to accomplish a command (e.g., camera position) previously received from the host processor (potentially many closed loop intervals ago), the secondary device always operates in open-loop mode, i.e., it always applies the DAC codes received from the primary device as soon as possible after being received.

At initialization of the primary device, the primary device is programmed with three timer values. First, a control loop timer is programmed with a delay shown in FIG. 9 as P (e.g., 200 microseconds). The control loop timer periodically triggers to generate a control loop IRQ. Two instances of the control loop IRQ are shown. Second, an event timer is programmed with a delay shown in FIG. 9 as K (e.g., 80 microseconds). The control loop timer begins to run when the control loop IRQ triggers and runs for K time at the end of which a control loop IRQ triggers. Third, a hardware pickup timer is programmed with a delay shown in FIG. 9 as J (e.g., 120 microseconds). The hardware pickup timer begins to run when the control loop IRQ triggers and runs for J time at the end of which the pickup hardware of the primary device picks up DAC codes previously written into registers of the primary device and applies the DAC codes to the current DACs of the primary device so that the current DACs output current to the camera VCMs (or other controlled elements of other devices in alternate embodiments).

Prior to the control loop IRQ, ADC inputs received from the camera VCMs (or other inputs from other devices in alternate embodiments) have settled and are available for use by the primary device firmware to calculate DAC codes for the control loop iteration that is about to start. Before the event timer expires, i.e., before the event timer IRQ triggers, the firmware of the primary device calculates DAC codes based on the settled ADC inputs for transmission to the secondary device. Additionally, before the hardware pickup timer expires, the firmware of the primary device calculates DAC codes based on the settled ADC inputs for application by the pickup hardware to the outputs of the primary device.

Figure 7:
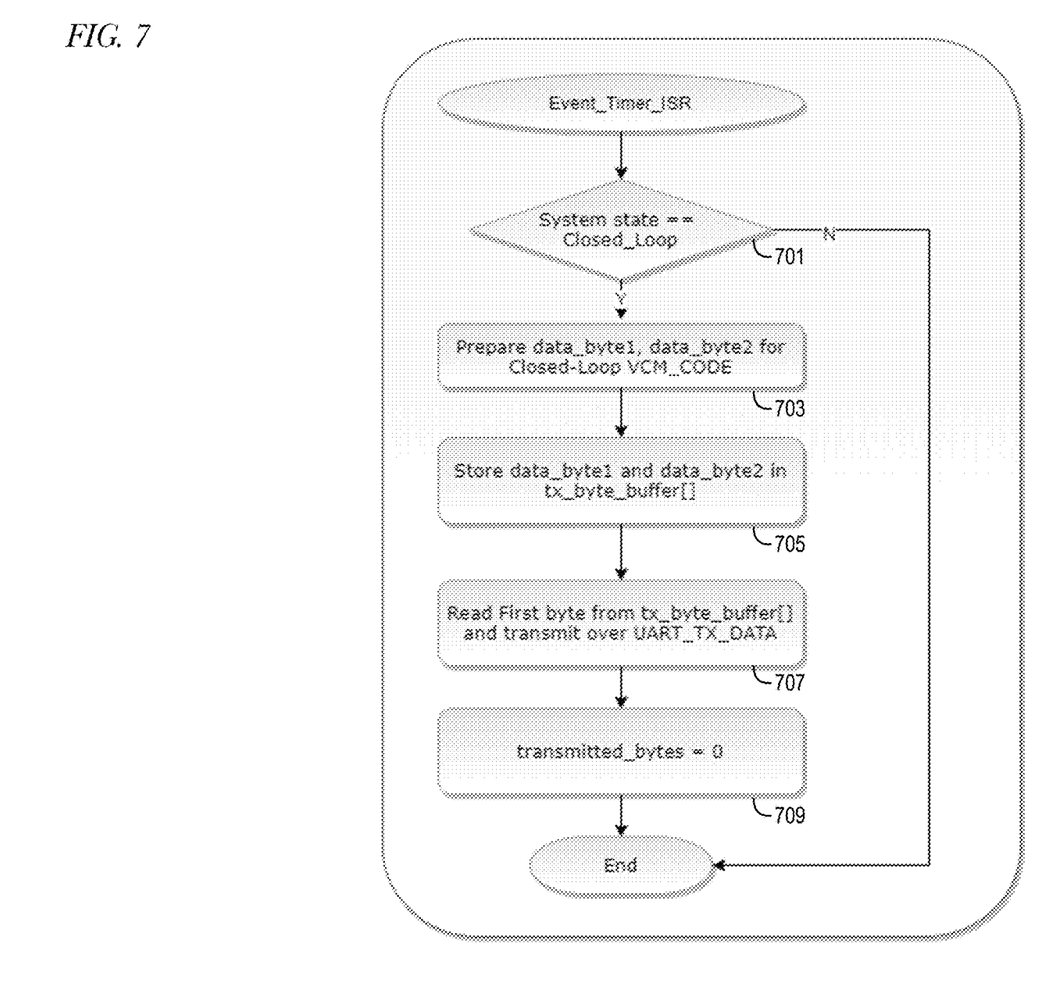
FIG. 7 is an example flowchart illustrating the handling by the primary device of FIG. 1 of transmission of a voice coil motor (VCM) code in event timer ISR in accordance with embodiments of the present disclosure.

In response to the event timer IRQ, the primary device transmits the DAC codes to the secondary device over the communication link according to the operation shown in FIG. 7, for example. The primary device firmware execution and DAC code transmission time is shown in FIG. 9 as a time L from the event timer IRQ. In response to receiving the DAC codes, the secondary device applies in an open loop fashion (i.e., as soon as possible and without delay) the received DAC codes to its current DACs so that the current DACs output current to the camera VCMs according to the operation shown in FIG. 4, for example. The secondary device firmware execution time is shown in FIG. 9 as a time M from reception of the DAC codes. Thus, the outputs of the secondary device generate the new current values to the camera VCMs at a point in time that is effectively K plus L plus M after the control loop IRQ, as shown. As described above, the outputs of the primary device generate the new current values to the camera VCMs in response to the hardware pickup that occurs a programmable time J after the current loop IRQ, as shown. The time between the output by the primary device and the secondary device is the primary/secondary output skew described above, which is shown as time N in FIG. 9. After the outputs generate the new current values to the VCMs, the ADC inputs from the sensors at the VCMs begin to settle and are settled prior to the next instance of the control loop IRQ.

As described above, the difference between the hardware pickup timer delay (J) and the event timer delay (K) is chosen to accomplish a couple of competing goals. One goal is to reduce the output skew (N), based on the primary device firmware delay plus transmission time (L) and the secondary device firmware delay (M). Another goal is to provide the firmware of the primary device sufficient time to calculate the secondary and primary DAC codes before the event timer triggers and the hardware pickup timer triggers, respectively. Advantageously, the values of J and K are programmable and therefore are effectively "knobs" that may be adjusted to tune the system 100 to meet the need of the application, e.g., camera control.

As described above, each of the primary and secondary devices may be separately configured to operate in either open loop mode or in closed loop mode. However, in the embodiments described, the secondary device is always configured to operate in the open loop mode. When the primary device is configured in the closed loop mode, the host processor sends information to the primary device (e.g., via the I2C interface), e.g., camera position information. The primary device then determines the current values that need to be output to the VCM's (via DAC codes) to cause the camera to reach and stay at the position specified by the host processor. Whereas, when the primary device is configured in open loop mode, the host processor directly specifies the current values (or the DAC codes that determine the current values), and the primary device simply applies its portion of the DAC codes and transmits the other portion to the secondary device. In other words, in open loop mode, it is the responsibility of the host processor to get the camera to the desired position without the primary device knowing the position, whereas in closed loop mode it is the responsibility of the primary device to get and keep the camera at the position commanded by the host processor. Furthermore, in open loop mode, the primary device immediately applies the DAC codes received from the host processor to generate the output current; whereas, in closed loop mode, the primary device waits to apply the DAC codes that it calculates to generate the output current until the hardware pickup timer triggers, which is periodic and programmable. For example, when the device in which the system 100 is included (e.g., phone with a camera) is started up (e.g., powered on or reset), the host processor of the phone may configure the primary device in open-loop mode to send DAC codes that coarsely position the lens of the camera, e.g., to a default position. Later, the host processor may receive more information (e.g., based on user input) about where the lens needs to be positioned and configures the primary device in closed-loop mode and sends the position to the primary device, in response to which the primary device positions the camera lens more finely and maintains the quality of the position of the camera lens.

Advantageously, the primary and secondary devices work together to appear to the host processor as a single operating entity whose outputs are synchronized. In one embodiment, the secondary device may inform the primary device in the event of a packet integrity failure so that the primary device may retransmit the packet. Additionally, the primary device may notify the host processor of such a failure and retransmission. Further advantageously, the system may be configured in multiple configurations with respect to the multiple outputs provided by the primary/secondary device combination. For example, embodiments are described above in which each of the primary and secondary devices has three outputs. One embodiment is described above in which VCM that control an Optical Image Stabilization (OIS) subsystem of the camera are driven by two outputs of the primary device, and VCM that control an Auto-Focus (AF) subsystem of the camera are driven by one output of the primary device and by one output of the secondary device. Another embodiment is described above in which the OIS subsystem is driven by two outputs of the primary device and the AF subsystem is driven by two outputs of the secondary device. However, the system may be configured in other combinations according to other embodiments to meet the needs of the application. For example, in one embodiment, there may be separate OIS-X and OIS-Y subsystems, in addition to an AF subsystem. Additionally, the system may be configured in different dimensions to accommodate operation of different subsystems in different modes. For example, the primary device may be configured in closed loop mode for one or more of the subsystems and configured in open loop mode for one or more of the remaining subsystems. Advantageously, the embodiments described herein provide a system in which the primary/secondary device combination appears to the host processor as a single device having N total available outputs when in fact each of the primary and second devices individually includes less outputs than the N total outputs. This configuration is advantageous because it alleviates the need for a re-design of the device to provide the needed N total outputs within a single device, which could involve significant investment both in terms of time and cost. Furthermore, in the case that the device is already pin-limited, a re-design may not be possible or may be possible only at the cost of a sacrifice in other features of the device.

As described above, in one embodiment, the Event Timer duration is programmed as an amount of time that begins to run after the Control Loop IRQ event occurs. In alternate embodiment, the Event Timer duration may be programmed as an amount of time leading up to the hardware pickup, i.e., relative to the hardware pickup rather than relative to the Control Loop IRQ. That is, the Event Timer IRQ occurs the programmed amount of time before the hardware pickup occurs. However, because of the transitive property and the fact that the hardware pickup timer is relative to the Control Loop IRQ, according to the alternate embodiment, the Event Timer IRQ is still effectively specified relative to the Control Loop IRQ event.

Although embodiments have been described for use in controlling a camera, more particularly voice coil motors of a camera, other embodiments are contemplated in which the primary/secondary device combination is used to control other types of devices. Finally, although embodiments are described in which a single secondary device is employed to expand the output capability of the system, other embodiments are contemplated in which an additional secondary device (or multiple additional secondary devices) may be in communication with the primary device-via another communication link between the primary device and the additional secondary device or via a communication link shared by the primary device and the multiple secondary devices-such that the primary device transmits updated values to the additional secondary device and the additional secondary device responsively applies the received updated values on its outputs.

It should be understood-especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein.

For example, communication of (synchronized) updates between primary device and secondary device may be through a variety of communication types, such as full-duplex communication or half-duplex communication. Such communication may support robustness of data transport, additional configurations, additional sensors and/or additional processing on the secondary device and the communicating by the secondary device of such information that at least includes the health of the secondary device and/or other status or information relevant to the primary device.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A system, comprising:
    a primary device and a secondary device each having one or more respective outputs;
    a communication link between the primary device and the secondary device;
    wherein the primary device comprises first and second hardware timers, each of which expires at a time derived from a periodic control loop trigger;
    wherein at expiration of the first timer, the primary device transmits one or more first updated values to the secondary device over the communication link;
    wherein at expiration of the second timer, hardware of the primary device picks up and applies one or more second updated values to the one or more outputs of the primary device;
    wherein in response to receiving the one or more first updated values from the primary device, the secondary device applies the received one or more first updated values to the one or more outputs of the secondary device; and
    wherein the first and second hardware timers are programmed with respective first and second delays relative to one another to:
        provide the primary device time to compute the one or more first and second updated values after the control loop trigger;
        reduce output skew between the hardware of the primary device picking up and applying the one or more second updated values and the secondary device applying the received one or more first updated values; and/or
        reduce output latency between the periodic control loop trigger and application of the one or more first and second updated values to the one or more outputs of the primary device and the secondary device.

2. The system of claim 1, wherein the primary device and the secondary device are camera controllers.

3. The system of claim 1, wherein the primary device is further operable in an alternate mode in which, rather than using the first and second hardware timers, the primary device aperiodically receives the first and second updated values from a third device and in response:
    transmits to the secondary device over the communication link the one or more first updated values received from the third device; and
    applies to the one or more outputs of the primary device the one or more second updated values received from the third device.

4. The system of claim 3, wherein the primary device comprises a processor that executes program instructions to apply to the one or more outputs of the primary device the one or more second updated values received from the third device as soon as possible.

5. The system of claim 1, wherein the one or more outputs of the primary device and the secondary device are N outputs in total, wherein each of the primary device and the secondary device individually includes less than N of the total N outputs.

6. The system of claim 1, wherein the secondary device comprises a processor that executes program instructions to apply the received one or more second updated values as soon as possible.

7. The system of claim 1, wherein the one or more first and second updated values are computed based on inputs available before the control loop trigger.

8. The system of claim 7, wherein the inputs are sensed from voice coil motors driven by the outputs of the primary device and the secondary device.

9. The system of claim 1, wherein the communication link is a half-duplex link.

10. The system of claim 1, wherein the communication link is a full-duplex link.

11. The system of claim 1, wherein the outputs drive currents to voice coil motors.

12. The system of claim 1, further comprising:
    an additional secondary device having one or more outputs;
    wherein at expiration of the first timer, the primary device transmits one or more third updated values to the additional secondary device; and
    wherein in response to receiving the one or more third updated values from the primary device, the additional secondary device applies the received one or more third updated values to the one or more outputs of the additional secondary device.

13. A method for synchronizing outputs of a primary device and a secondary device each having one or more respective outputs and a communication link between them, comprising:
    running first and second hardware timers of the primary device, each of which expires at a time derived from a periodic control loop trigger;
    transmitting, by the primary device at expiration of the first timer, one or more first updated values to the secondary device over the communication link;
    picking up and applying, by hardware of the primary device at expiration of the second timer, one or more second updated values to the one or more outputs of the primary device;
    applying, by the secondary device in response to receiving the one or more first updated values from the primary device, the received one or more first updated values to the one or more outputs of the secondary device; and
    programming the first and second hardware timers with respective first and second delays relative to one another to:
        provide the primary device time to compute the one or more first and second updated values after the control loop trigger;
        reduce output skew between the hardware of the primary device picking up and applying the one or more second updated values and the secondary device applying the received one or more first updated values; and/or
        reduce output latency between the periodic control loop trigger and application of the one or more first and second updated values to the one or more outputs of the primary and secondary devices.

14. The method of claim 13, wherein the primary device and the secondary device are camera controllers.

15. The method of claim 13, further comprising:
operating the primary device in an alternate mode in which, rather than using the first and second hardware timers, the primary device aperiodically receives the first and second updated values from a third device and in response:
    transmitting to the secondary device over the communication link the one or more first updated values received from the third device; and
    applying to the one or more outputs of the primary device the one or more second updated values received from the third device.

16. The method of claim 15, wherein the primary device comprises a processor that executes program instructions to apply to the one or more outputs of the primary device the one or more second updated values received from the third device as soon as possible.

17. The method of claim 13, wherein the one or more outputs of the primary device and the secondary device are N outputs in total, wherein each of the primary and secondary devices individually includes less than N of the total N outputs.

18. The method of claim 13, wherein the secondary device comprises a processor that executes program instructions to apply the received one or more second updated values as soon as possible.

19. The method of claim 13, further comprising:
computing the one or more first and second updated values based on inputs available before the control loop trigger.

20. The method of claim 19, further comprising:
sensing the inputs from voice coil motors driven by the outputs of the primary device and the secondary device.

21. The method of claim 13, wherein the communication link is a half-duplex link.

22. The method of claim 13, wherein the communication link is a full-duplex link.

23. The method of claim 13, wherein the outputs drive currents to voice coil motors.

24. The method of claim 13, further comprising:
transmitting, by the primary device at expiration of the first timer, one or more third updated values to an additional secondary device having one or more outputs; and
applying, by the additional secondary device in response to receiving the one or more third updated values from the primary device, the received one or more third updated values to the one or more outputs of the additional secondary device.

* * * * *